Figure 1:
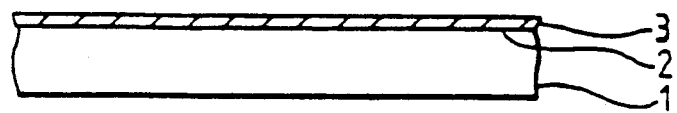

United States Patent [19]

Lansbury et al.

[11] Patent Number: 5,147,696

[45] Date of Patent: Sep. 15, 1992

[54] MULTIPLE-LAYER POLYOLEFIN FILMS

[75] Inventors: Robert C. Lansbury; Douglas L. Mitchell, both of Hertfordshire, England

[73] Assignee: Imperial Chemical Industries PLC, London, England

[21] Appl. No.: 620,473

[22] Filed: Nov. 30, 1990

[30] Foreign Application Priority Data

Nov. 30, 1989 [GB] United Kingdom ............... 8927050
Feb. 21, 1990 [GB] United Kingdom ............... 9003902

[51] Int. Cl.$^5$ .................... B65D 65/40; B29D 22/00; B32B 27/08
[52] U.S. Cl. .................... 428/36.4; 428/327; 428/332; 428/349; 428/516; 428/910
[58] Field of Search ............... 428/327, 349, 516, 323, 428/332, 36.4

[56] References Cited

U.S. PATENT DOCUMENTS

| | | | |
|---|---|---|---|
| 4,348,457 | 9/1982 | Rosenthal et al. | 428/349 |
| 4,419,411 | 12/1983 | Park | 428/516 |
| 4,833,017 | 5/1989 | Benoit | 428/520 |
| 4,997,700 | 3/1991 | Bothe et al. | 428/216 |

FOREIGN PATENT DOCUMENTS

| | | |
|---|---|---|
| 317166 | 5/1989 | European Pat. Off. . |
| 0361280 | 4/1990 | European Pat. Off. . |
| 0447652 | 9/1991 | European Pat. Off. . |
| 2941909 | 4/1981 | Fed. Rep. of Germany . |

*Primary Examiner*—P. C. Sluby
*Attorney, Agent, or Firm*—Cushman, Darby & Cushman

[57] ABSTRACT

A multiple-layer film comprises an oriented propylene polymer substrate with a heat-sealable layer comprising an ethylene polymer of density not exceeding 0.95 g cm$^{-3}$ and containing a spherical, non-agglomerating additive of particle size not exceeding 5.0 μm.

Such films offer improved blocking- and abrasion-resistance, and are of utility in high-speed packaging operations.

10 Claims, 1 Drawing Sheet

MULTIPLE-LAYER POLYOLEFIN FILMS

This invention relates to a polyolefin film and, in particular, to a multiple-layer polyolefin film.

The packaging industry requires large quantities of heat-sealable film, which can be exposed to temperatures at which the film can be sealed to itself without impairment of the film integrity. Polyolefins are in demand as film-forming materials by virtue of their strength and clarity but, in general, exhibit relatively poor heat-sealing characteristics. Attempts to improve the latter usually involve the creation of a composite, multiple-layer film structure having a relatively poorly sealable polyolefin film base and a surface layer of a heat-sealable material which can be melted at a temperature below that at which the polyolefin begins to soften. To be effective, this layer of heat-sealable material must be sealable over a relatively wide temperature range, must adhere securely to the film base, and must be sealable to itself to provide a bond of adequate strength—usually referred to as the heat-seal strength.

The nature of the heat-sealable material is generally such that the resultant film exhibits the phenomenon of "blocking" in which undesirable adhesion occurs between two layers of film placed in contact under moderate pressure, as may arise during processing, use or storage of the film. Such films do not perform well on film-handling equipment, and attempts to peel apart adjacent layers of blocked film may severely damage the film surface.

The susceptibility of a film to blocking may be reduced by incorporation into the film of a particulate additive, such as silica and/or alumina, having an average particle size of up to about 20 $\mu$m. However, the inclusion of a conventional anti-blocking particulate additive in the relatively soft heat-sealable layer of a multi-layer packaging film creates further problems associated with abrasion on passage of the filled film through packaging machinery. In particular, use of such films in the high speed overwrapping of cigarete packets has been observed to generate an excessive accumulation of abrasive debris and foreign matter on, and around, the elements of the packaging machinery. Such debris is offensive to the machine attendants, detracts from the sealing characteristics of the film, may scuff or scratch the film to an unacceptable degree and reduces out-put consequent upon the need to effect regular removal of accumulated contamination from the machinery.

We have now devised a multiple-layer film which overcomes or substantially eliminates the aforementioned problems.

Accordingly, the present invention provides a multiple-layer film comprising a substrate layer of a polyolefin and, on at least one surface thereof, a polymeric heat-sealable layer wherein a) the substrate comprises a layer of an oriented propylene polymer, and b) the heat-sealable layer comprises an ethylene polymer i) of density not exceeding 0.95 g cm$^{-3}$ at 23° C., and containing ii) an effective amount of a substantially spherical, non-agglomerating particulate additive having an average particle size not exceeding 5.0 $\mu$m.

The invention further provides a method of producing a multiple-layer film comprising a substrate layer of a polyolefin and, on at least one surface thereof, a polymeric heat-sealable layer by a) forming a substrate comprising a layer of an oriented propylene polymer, and providing thereon b) a heat-sealable layer comprising an ethylene polymer i) of density not exceeding 0.95 g cm$^{-3}$ at 23° C., and containing ii) an effective amount of a substantially spherical, non-agglomerating, particulate additive having an average particle size not exceeding 5.0 $\mu$m.

The invention still further provides a package comprising an article, such as a cigarette packet, wrapped in a film as hereinbefore defined.

A multiple-layer film as hereinbefore defined is "self-supporting" in the sense that it is capable of independent existence in the absence of a supporting base.

The propylene polymer forming the oriented substrate layer is suitably a propylene homopolymer or a propylene-olefin copolymer. In particular, the substrate for a packaging film conveniently comprises either a propylene homopolymer or a propylene-olefin block copolymer containing up to 15%, by weight of the copolymer, of at least one copolymerisable olefin—such as ethylene.

An ethylene polymer suitable for use in forming the heat-sealable layer(s) of a film according to the invention comprises an ethylene homopolymer or a copolymer in which the ethylene content exceeds the total amount of other monomer(s) copolymerised therewith. A particularly suitable heat-sealable layer comprises a random copolymer of ethylene with at least one alphamonoolefin containing from 3 to 10 carbon atoms in its molecule.

By a random ethylene-monoalphaolefin copolymer is meant a copolymer comprising a polymer chain in which the ethylene and monoalphaolefin units are distributed in accordance with random statistics with no preference for long runs of one or other unit beyond that required to achieve the overall desired composition. Such copolymers are conveniently prepared by reacting ethylene and at least one higher monoalphaolefin in the desired proportions in a catalysed polymerisation zone.

Suitable monoalphaolefin monomers for copolymerising with ethylene to form the random heat-sealable copolymer include propylene, pentene-1, hexene-1, heptene-1, octene-1 and decene-1, although butene-1 has proved to be a particularly suitable comonomer.

The monoalphaolefin content of the random copolymer, determined by peak height measurement of the infra-red spectrum of the copolymer, is desirably within a range of from 0.5 to 15, conveniently from 1 to 10, preferably from 2 to 7, and particularly preferably from 3 to 4, percent by weight of the copolymer.

An ethylene copolymer suitable for the formation of a heat-sealable surface layer on a substrate as hereinbefore defined should have a density not exceeding 0.950, and preferably in a range of from 0.910 to 0.950, g cm$^{-3}$ at 23° C. Selection of an ethylene copolymer having a density within the specified range is of importance in ensuring an acceptable degree of adhesion between the substrate and applied heat-sealable layer. Multi-layer films with a surface layer of an ethylene copolymer having a density below the specified range exhibit poor peel adhesion—with a tendency to delaminate at the interface between the substrate and surface layer under conditions of stress, while undesirable substrate shrinkage behaviour is experienced as the density of the heat-sealable copolymer layer is increased above the upper limit of the specified range, thereby requiring increased temperature to effect an adequate seal. The density of the ethylene copolymer is also of importance in achieving acceptable heat-sealing behaviour, i.e. suitably low threshold sealing temperature (e.g. <100° C.), acceptably wide sealing range (e.g. 100°–140° C.), and desirably high seal strength (e.g. 250–600 g/25 mm). Preferably, therefore, the copolymer has a density (g cm$^{-3}$) at 23° C. of from about 0.910 to about 0.950, particularly preferably from about 0.930 to about 0.940.

The production of films having acceptable optical characteristics, e.g. haze, is assisted by selecting an ethylene copolymer having a melt flow index, measured in accordance with ASTM/D1238-65T (condition E), of from 5 to 10 g/10 minutes, and preferably of from 6 to 8 g/10 minutes. Suitable ethylene copolymers therefore exhibit a molecular weight (weight average) of from about 70,000 to about 55,000, and preferably from about 65,000 to about 57,000.

If desired, the optical characteristics of the films of the invention may be further improved by restricting the choice of ethylene copolymer for the surface layer(s) to one having a relatively narrow molecular weight distribution—for example, Mw/Mn of from 3 to 5, wherein Mw and Mn are respectively the weight and number average molecular weights.

Formation of the various olefin homo- and co-polymers herein described as being suitable for use in the multiple-layer films of the invention is conveniently effected in the presence of an organo-metallic catalyst, such as a transition metal compound with an organo-metallic activator. Particularly useful compounds of this type are titanium halide compounds activated with aluminium alkyl compounds. A preferred material is a titanium chloride.

Polymerisation of the olefin monomers may be effected in known manner—for example, in the presence or absence of an inert diluent, such as a suitably purified paraffinic hydrocarbon, in the liquid phase using an excess of liquid monomer as the polymerisation medium, or in the gas phase, the latter term being herein employed to indicate the essential absence of a liquid medium.

To inhibit abrasive dislodgement in contact with packaging machinery, or other film-handling equipment, a particulate additive for inclusion in the heat-sealable layer of a film according to the invention is substantially spherical. Thus, an individual additive particle is of substantially circular cross-section irrespective of the selected viewing point. Desirably, an individual particle exhibits an aspect ratio $d_1:d_2$ (where $d_1$ and $d_2$, respectively, are the maximum and minimum dimensions of the particle) in a range of from 1:1 to 1:0.5, and preferably from 1:1 to 1:0.8.

To confer adequate abrasion- and blocking-resistance the particulate spherical additive should be finely-divided, the average particle size thereof not exceeding 5.0 μm (micron). The presence of excessively large particles is detrimental to transparency and, if dislodged, may promote scratching of the film surface. Desirably, therefore, the actual particle size of 99% by number of the particles should not exceed 20 μm, and preferably not exceed 15 μm. Preferably the average particle size of the additive is from 0.25 to 4.5 μm, particularly preferably from 0.75 to 3.0 μm. Decreasing the particle size improves the gloss of the film.

Particle sizes may be measured by electron microscope, coulter counter or sedimentation analysis and the average particle size may be determined by plotting a cumulative distribution curve representing the percentage of particles below chosen particle sizes.

Examination of abrasive debris from conventional particle-filled films frequently reveals an accumulation of aggregated particles the increased size of which apparently contributes to the ease with which they are torn from the film surface. Accordingly, a particulate additive for use in accordance with the invention comprises a non-agglomerating additive the primary particle structure of which remains inviolate during compounding with the ethylene heat-sealable polymer, and film formation therefrom, whereby the discrete particle form of the additive is retained in the finished film.

The amount of spherical additive incorporated into the heat-sealable layer is desirably in excess of 0.1%, preferably between 0.1 and 2.0%, and particularly preferably between 0.25 and 0.85%—for example, about 0.45%, by weight of the heat-sealable ethylene polymer. In amounts of 0.1%, and below, blocking performance of the film is inadequate, while at levels above 2.5% the optical characteristics of the film tend to be impaired.

A spherical particulate additive for inclusion in the heat-sealable layer may comprise an inorganic or an organic additive, or a mixture of two or more such additives.

Suitable particulate inorganic additives include inorganic fillers, and particularly metal or metalloid oxides, such as alumina and silica. Solid or hollow, glass or ceramic micro-beads or micro-spheres may also be employed.

Such additives may be homogeneous and consist essentially of a single material or compound such as silica alone. Alternatively, at least a proportion of the additive may be heterogeneous, the primary particulate material being associated with an additional modifying component. For example, the primary particle may be treated with a surface-modifier such as a surfactant, coupling agent or other modifier, to promote or alter the degree to which the additive is compatible with the heat-sealable ethylene polymer.

Suitable spherical organic additives include an incompatible resin which either does not melt, or which is substantially immiscible with the ethylene polymer, at the highest temperature encountered during extrusion and fabrication of the film. Such resins include polyamides and polyesters—such as polyethylene terephthalate.

A spherical organic additive of utility in accordance with the invention comprises a condensate resin incorporating a triazine ring structure, particularly those in which at least one amino group is attached to the triazine ring. Condensation of the triazine resin may be effected with an aldehyde, such as formaldehyde or acetaldehyde, or with a difunctional monomer such as diaminoethane or glycine. Particularly suitable resins include an aldehyde condensate with melamine or guanamine or a derivative thereof, such as a melamine-formaldehyde resin, a guanamine-formaldehyde resin or a benzoguanamine-melamine-formaldehyde resin.

Another useful organic additive comprises spherical particles of an acrylic and/or methacrylic resin comprising a polymer or copolymer of acrylic acid and/or methacrylic acid and/or a lower alkyl (up to 6 carbon atoms) ester thereof. Such resins may be cross-linked, for example—by the inclusion therein of a cross-linking agent, such as a methylated melamine-formaldehyde resin. Promotion of cross-linking may be assisted by the provision of appropriate functional groupings, such as hydroxy, carboxy and amido groupings, in the acrylic and/or methacrylic polymer. A preferred organic additive comprises spherical particles of a cross-linked methyl methacrylate polymer, especially a mono-dispersed polymethyl methacrylate having an average particle size of from 1.5 to 2.5 μm, and particularly of the order of 2.0 μm.

Formation of a heat-sealable medium is conveniently effected by mixing appropriate quantities of the ethylene polymer and spherical additive. A dry blending technique in which, for example, the dry, free-flowing components are physically mixed in a tumble blender, typically for one minute at ambient temperature, may be employed. If desired, the physical mixing technique is supplanted or supplemented by a melt blending technique in which the components are melt-extruded, quenched and chopped into finely divided (powder or granular) form to ensure the production of a homogeneous heat-sealable medium.

Application of the heat-sealable medium on to the substrate layer is conveniently effected by any of the laminating or coating techniques conventionally employed in the production of composite multi-layer films. Preferably, however, the heat-sealable layer is applied to the substrate by a coextrusion technique in which the polymeric components of the substrate and heat-sealable layers are coextruded into intimate contact while each is still molten. Preferably, the coextrusion is effected from a multi-channel annular die so designed that the molten polymeric components constituting individual layers of the composite film merge at their boundaries within the die to form a single composite structure which is then extruded from a common die orifice in the form of a tubular extrudate.

A composite film of the invention is oriented by stretching at a temperature above the glass transition temperature of the polymer(s). For example, orientation of a film having a propylene homopolymer substrate layer is conveniently effected at a temperature within a range of from about 145° to 165° C. Orientation may be effected uniaxially, by stretching the film in one direction, or biaxially, by stretching the film in each of two mutually perpendicular directions in the plane of the film, and the biaxial orientation may be balanced or unbalanced, for example with the higher degree of orientation of an unbalanced film in a preferred direction—usually the transverse direction. Conveniently, the polypropylene substrate material and the heat-sealable medium are coextruded in the form of a composite tube which is subsequently quenched, reheated, and then expanded by internal gas pressure to induce transverse orientation, and withdrawn, at a rate greater than that at which it is extruded, to stretch and orient it in the longitudinal direction. Alternatively, a flat, multiple-layer film may be oriented by simultaneous or sequential stretching in each of two mutually perpendicular directions by means of a stenter, or by a combination of draw rolls and a stenter.

The degree to which the film substrate is stretched depends to some extent on the ultimate use for which the film is intended, but for a polypropylene-based packaging film satisfactory tensile and other properties are generally developed when the film is stretched to between three and ten, preferably, seven, times its original dimensions in each of the transverse and longitudinal directions.

After stretching, the polymeric film is normally "heat-set", while restrained against shrinkage or even maintained at constant dimensions, at a temperature above the glass transition temperature of the polymer and below its melting point. The optimum heat-setting temperature can readily be established by simple experimentation, and for a polypropylene substrate layer, "heat-setting" is conveniently effected at temperatures in the range of from 100° C. to 160° C. Heat-setting may be effected by conventional techniques—for example by means of a stenter system, or by a system of one or more heated rollers as disclosed, for example, in GB-A-1124886. Alternatively, or additionally, the film may be subjected to a constrained heat treatment of the kind described in EP-A-23776.

Composite multiple-layer films in accordance with the invention may be prepared in a range of thicknesses governed primarily by the ultimate application for which a particular film is to be employed. Films, having a total thickness in a range extending from 2.5 to 100 μm are of general utility, but for packaging applications we prefer to employ a film of from about 10 to 50 μm in total thickness.

The ratio of substrate to ethylene polymer layer thickness may vary within a wide range, although preferably the thickness of the ethylene polymer layer should not be less than 0.2% (preferably 0.5%), nor greater than 50% of that of the substrate. In practice, the hot seal strength of a multiple-layer film according to the invention increases approximately in proportion to the thickness of the ethylene polymer layer. To ensure an acceptably high value of hot seal strength, we prefer that the thickness of the ethylene polymer layer should be at least 0.05 μm and preferably should not greatly exceed about 1.0 μm, a particularly suitable range of thickness being from 0.25 to 0.75 μm.

If desired, both of the substrate surfaces may be provided with an ethylene polymer heat-sealable layer, and the thicknesses of the two heat-sealable layers may be the same or different. For example, a substrate film of 25 μm thickness is conveniently provided with an ethylene polymer layer of 0.75 μm thickness on one surface and with an ethylene polymer layer of 0.25 μm thickness on the other surface. Alternatively, one surface of the substrate may be uncoated, or may be coated with a layer of a different composition depending on the properties required of the film for a particular application.

If desired, for example to improve print receptivity, a surface of a multiple-layer film according to the invention may be subjected to a chemical or physical surface-modifying treatment, a preferred treatment, because of its simplicity and effectiveness, being to subject the film surface to a high voltage electrical stress accompanied by corona discharge.

One or more of the layers of a composite film of the invention may conveniently contain any of the additives conventionally employed in the manufacture of thermoplastics films. Thus, additives such as dyes, pigments, lubricants, anti-static agents, anti-oxidants, surface-active agents, stiffening aids, slip aids, gloss-improvers, prodegradants, and ultra-violet light stabilisers may be employed. If desired, such additives—particularly an anti-static system, may be applied directly to a surface of the film, preferably prior to orientation—for example by a wash-coating technique.

Composite films prepared in accordance with the invention are heat-sealable at comparatively low temperatures, for example at temperatures of the order of 120° C. and lower, to provide a strong, hermetic seal. In addition, the heat-sealable coating adheres securely to the substrate material. In particular, the films exhibit excellent resistance to blocking and to deposition of abrasive debris when used on high-speed film-handling equipment.

The following test methods are employed in assessing films according to the invention:

(a) Heat-seal strength

Two strips of a multiple-layer film having at least one heat-sealable surface layer are placed with the heat-sealable surfaces in contact with each other, and the ends of the strips sealed together between the jaws of a Sentinel Heat Sealer, Model No. 12AS, only one jaw of the unit being heated. The strength of the seal is measured by cutting from the sealed-together strips of film, which have been allowed to cool to ambient temperature, a strip 25 mm wide and some 100 mm long, the heat seal extending across the entire width of the strip and having an area of some 25×25 mm. The unsealed ends of the strip are then attached respectively to a dynamometer and a gripping surface, a load is applied to the gripping surface, and the load required to separate the strips in the sealed area, at a rate of 30.5 cm per minute, is recorded by the dynamometer, and expressed as a seal strength of $\times g/25$ mm, where x is the load in grammes.

(b) Blocking

Two or more strips of film, each about 75×150 mm, are placed in surface contact between glass plates under a load of 350 kgm$^{-2}$ and maintained at a temperature of 70° C. for 3 hours. On cooling to ambient temperature the force required to separate adjacent strips of film is measured by means of a Blocking Balance and expressed in units of g/75 mm width.

(c) Abrasion

The surface of a film to be tested is drawn in contact, under a load of 1.8 kg, and at a film speed of 16.5 m/min, with two metal jaws in tandem, each jaw being heated to a temperature of 140° C. After testing for a period of 30 minutes, the total deposit of debris is collected from both jaws and weighed. The weight of accumulated debris, expressed in mg, provides a measure of the abrasion resistance of the film.

(d) Haze

Wide angle haze (Gardner) values are measured in accordance with ASTM:D1003.

Figure 2:
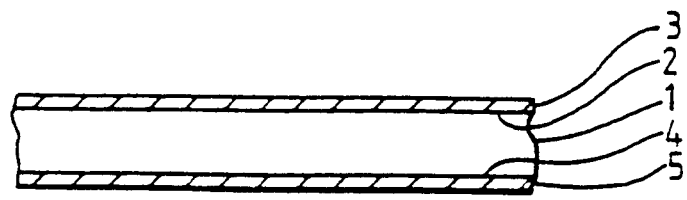

The invention is illustrated by reference to the accompanying drawings in which:

FIG. 1 depicts a side elevation of a portion of a multiple layer film having an oriented propylene polymer substrate 1 and on a surface 2 thereof a thin heat-sealable layer 3 formed from an ethylene-butene-1 random copolymer containing a spherical, non-agglomerating, particulate additive, and FIG. 2 depicts a side elevation of a similar film portion having, on the second surface 4 of substrate 1, a heat-sealable layer 5.

The invention is further illustrated by reference to the following Examples:

EXAMPLE 1

A heat-sealable composition was formed by tumble blending an ethylene-butene-1 random copolymer, containing about 3% by weight of butene-1, with 0.45% by weight, of the copolymer, of a spherical, non-agglomerating, melamine-formaldehyde particulate resin additive having an average particle size of from 1 to 3 μm.

The ethylene-butene-1 copolymer had a density of 0.935, a melt flow index (ASTM/D1238-65T-condition E) of 5 g/10 min, and a melting temperature of 120° C.

From a triple channel annular die were coextruded a propylene homopolymer and the heat-sealable composition so as to form a polypropylene tube the internal and external surfaces of which were coated with a layer of the ethylene-butene-1 copolymer composition.

The coated polypropylene tube was cooled by passage over a mandrel within the tube, and externally quenched by passage through a water bath surrounding the mandrel, heated to stretching temperature, expanded by internal gas pressure, and withdrawn from the expansion zone at a rate greater than that at which it was fed thereto, so that the tube was stretched to seven times its original dimensions in both the direction of extrusion and in a direction transverse thereto.

The stretched tubular film was then opened out to form flat film which was subsequently heat-set at a temperature of 120° C. on a matt-surfaced roller heat-setter of the kind described in GB-A-1124886.

Discharge treatment of the heat-set film was effected by a single aluminium rod electrode extending across the entire width of the film, and connected to a Sherman GT60, 6 kilowatts, solid state corona treater, operating at 2 amps.

The thickness of the ethylene copolymer composition layer on each surface of the resultant film was 0.3 μm, the substrate having a thickness of about 25 μm.

Samples of the film were heat-sealed on a Sentinel Heat Sealer, Model No 12AS, operating at a jaw pressure of 15 psi (0.1 MNm$^{-2}$), a jaw closure time of 2 seconds, and a jaw temperature of 120° C.

Film assessed in accordance with the aforementioned test procedures exhibited the following characteristics:

| | |
| --- | --- |
| Heat seal strength | 350 g/25 mm |
| Blocking resistance | 55 g/75 mm |
| Abrasion | 0 mg |

EXAMPLE 2

The procedure of Example 1 was repeated save that the organic particulate additive in the ethylene-butene-1 copolymer was replaced by 0.45% by weight of inorganic ceramic spherical zeospheres having an average particle size of from 2 to 4.5 μm.

The resultant film exhibited the following characteristics:

| | |
| --- | --- |
| Heat-seal strength | 400 g/25 mm |
| Blocking resistance | 50 g/75 mm |
| Abrasion | 0.4 mg |

EXAMPLES 3 TO 6

These are comparative Examples, not according to the invention.

The procedure of Example 1 was repeated save that the organic spherical particulate additive was replaced by inorganic silica particles of variable, non-spherical shape in respective amounts specified, together with resultant film characteristics, in accompanying Table 1.

TABLE 1

| Example | Particle Type | Av. Part. Size (μm) | Shape | Conc.$^n$ (wt %) | Heat-seal Strength (g/25 mm) | Blocking (g/75 mm) | Abrasion (mg) |
|---|---|---|---|---|---|---|---|
| 1 | Melamine-Formaldehyde | 1–3 | Spherical | 0.45 | 350 | 55 | 0.0 |
| 2 | Ceramic Zeospheres | 2–4.5 | Spherical | 0.45 | 400 | 50 | 0.4 |
| 3* | Silica | 3–5 | Variable | 0.45 | 350 | 3 | 8.5 |
| 4* | Silica | 3–5 | Variable | 0.2 | 400 | 24 | 2.1 |
| 5* | Silica | 3–5 | Variable | 0.1 | 400 | 60 | 0.6 |
| 6* | None | — | — | — | 400 | 250 | 0.0 |

*Comparative

EXAMPLES 7 TO 12

The procedure of Example 1 was repeated save that the thickness of the ethylene-butene-1 copolymer was varied, and that the particulate additive therein was replaced by varying concentrations of spherical particles of a cross-linked polymethyl methacrylate resin having an average particle diameter of 2.0 μm, as specified in accompanying Table 2.

EXAMPLES 13 TO 14

These are comparative Examples, not according to the invention.

The procedure of Example 1 was repeated save that the organic spherical particulate additive was replaced by inorganic silica particles of variable, non-spherical shape, and of average particle size from 3 to 10 μm, as specified in accompanying Table 2.

TABLE 2

| Example | Coat Thickness (μm) | Particle Type | Av. Size (μm) | Shape | Conc.$^n$ (wt %) | Heat-seal Strength (g/25 mm) | Blocking (g/75 mm) | Abrasion (mg) | Haze |
|---|---|---|---|---|---|---|---|---|---|
| 7 | 0.3 | PMMA** | 2.0 | Spherical | 0.5 | 350 | 58 | 1.1 | 0.9 |
| 8 | 0.45 | PMMA** | 2.0 | Spherical | 0.5 | 400 | 20 | 4.6 | 1.5 |
| 9 | 0.3 | PMMA** | 2.0 | Spherical | 0.75 | 350 | 19 | 1.5 | 1.1 |
| 10 | 0.45 | PMMA** | 2.0 | Spherical | 0.75 | 400 | 11 | 5.2 | 1.6 |
| 11 | 0.3 | PMMA** | 2.0 | Spherical | 1.0 | 350 | 17 | 3.9 | 1.2 |
| 12 | 0.45 | PMMA** | 2.0 | Spherical | 1.0 | 400 | 12 | 5.3 | 1.4 |
| 13* | 0.3 | Silica | 3–10 | Variable | 0.45 | 350 | 15 | 9.0 | 1.1 |
| 14* | 0.45 | Silica | 3–10 | Variable | 0.45 | 400 | 10 | — | 1.9 |

*Comparative
**PMMA: cross-linked polymethylmethacrylate

We claim:

1. A multiple-layer film comprising a substrate layer of a polyolefin and, on at least one surface thereof, a polymeric heat-sealable layer wherein
   a) the substrate comprises a layer of an oriented propylene polymer, and
   b) the heat-sealable layer comprises an ethylene polymer
      i) of density not exceeding 0.95 g.cm$^{-3}$ at 23° C., and containing
      ii) an effective amount of a substantially spherical, non-agglomerating, particulate additive having an average particle size not exceeding 5.0 μm.

2. A film according to claim 1 wherein the heat-sealable layer comprises a copolymer of ethylene with from 0.5 to 15%, by weight of the copolymer, of an alphamonoolefin the molecule of which contains from 3 to 10 carbon atoms.

3. A film according to claim 2 wherein the ethylene copolymer is an ethylene-butene-1 copolymer.

4. A film according to claim 1 wherein the particle aspect ratio of the spherical additive is within a range of from 1:1 to 1:0.5.

5. A film according to claim 1 wherein the spherical additive is present in an amount of from 0.1 to 2.0% by weight of the ethylene polymer.

6. A film according to claim 1 wherein the average particle size of the spherical particulate additive is from 0.25 to 4.5 μm.

7. A film according to claim 6 wherein the spherical particulate additive comprises an aldehyde-triazine condensate resin.

8. A film according to claim 6 wherein the spherical particulate additive comprises an acrylic and/or a methacrylic polymer resin.

9. A method of producing a multiple-layer film comprising a substrate layer of a polyolefin and, on at least one surface thereof, a polymeric heat-sealable layer by
   a) forming a substrate comprising a layer of an oriented propylene polymer, and providing thereon
   b) a heat-sealable layer comprising an ethylene polymer
      i) of density not exceeding 0.95 gcm$^{-3}$ at 23° C., and containing
      ii) an effective amount of a substantially spherical, non-agglomerating, particulate additive having an average particle size not exceeding 5.0 μm.

10. A package comprising an article wrapped in a film according to claim 1.

* * * * *